United States Patent [19]
Dzung

[11] Patent Number: 4,882,737
[45] Date of Patent: Nov. 21, 1989

[54] SIGNAL TRANSMISSION METHOD
[75] Inventor: Dacfey Dzung, Würenlos, Switzerland
[73] Assignee: BBC Brown Boveri AG, Baden, Switzerland
[21] Appl. No.: 219,343
[22] Filed: Jul. 15, 1988
[30] Foreign Application Priority Data
  Jul. 31, 1987 [CH] Switzerland .................. 2951/87
[51] Int. Cl.⁴ ............... H03H 17/00; H04J 11/00; H04L 23/02
[52] U.S. Cl. ..................... 375/15; 375/39; 375/96; 375/102
[58] Field of Search ............ 375/12, 13, 14, 15, 375/39, 102, 96; 364/724.2; 333/18; 370/20

[56] References Cited
U.S. PATENT DOCUMENTS
4,308,618 12/1981 Levy et al. ............... 375/15
4,631,735 12/1986 Qureshi ................... 375/39
4,675,880  6/1987 Davarian .................. 375/39

OTHER PUBLICATIONS
International Conference on Communications, ICC '79, Boston, U.S., 10–14, Jun. 1979, vol. 2, IEEE (NY, US) C. C. W. Wong et al., pp. 25.
IEE Proceedings, section A a I, vol. 130, No. 5, Part F, Aug. 1983, (Old Woking, Surrey, GB) A. P. Clark et al., pp. 368–376.

Primary Examiner—Benedict V. Safourek
Attorney, Agent, or Firm—Oblon, Spivak, McClelland, Maier & Neustadt

[57] ABSTRACT

A signal transmission method according to the principle of quadrature/amplitude modulation, in which digital data occurring at a time interval T are formed into a transmit signal with the aid of pulse shapers (3a, 3b) having a given unit pulse response r(t) in a transmitter (4), the transmit signal is transmitted by means of a carrier oscillation via a channel (5) having a channel unit pulse response h(t), when an additive white noise w(t) is superimposed on it, so that a receive signal y(t) is present in a receiver (10), and in which the receive signal y(t) is preprocessed by channel-matched filters (7a, 7b) in the receiver (10), has channel-matched filters (7a, 7b) which are matched to a filter cascade H(t) formed by pulse shapers (3a, 3b) and channel (5) as a whole. The channel-matched filters f(7a, 7b) are preferably transverse filters the data points of which are at a time interval $\Delta T$ which is small in relation to the time interval T of the digital data. An estimation of the channel unit pulse response h(t) is determined in that the unit pulse response of the filter cascade H(t) is convoluted with a filter $r^{-1}(t)$ which is inverse to the pulse shaper.

6 Claims, 2 Drawing Sheets

SIGNAL TRANSMISSION METHOD

BACKGROUND OF THE INVENTION

1. Field of the Invention

The invention relates to a signal transmission method according to the principle of quadrature/amplitude modulation which digital data occurring at a time interval T are formed into a transmit signal with the aid of pulse shapers having a given unit pulse response r(t) in a transmitter, the transmit signal is transmitted by means of a carrier oscillation via a channel having a channel unit pulse response h(t) when an additive white noise w(t) is superimposed on it, so that a receive signal y(t) is present at a receiver and the receive signal y(t) is preprocessed by channel-matched filters in the receiver.

2. Discussion of Background

Rugged digital signal transmission methods have a central significance in the digitisation of mobile radio sets. These methods can be divided into several classes. It is especially the method of quadrature/amplitude modulation (QAM) which is to be considered at this point. The basic principles of such methods are described in detail, for example, in the book by J. G. Proakis, "Digital Communications", New York, McGraw-Hill, 1983.

One problem which must be solved in order to be able to implement such a signal transmission method is the identification of the channel via which signals are transmitted from a transmitter to a receiver. The quality of such an identification, also called estimation, essentially determines the extent to which a receiver can operate without errors. Particularly in the case of mobile radio systems, the channel changes with time so that it is not possible to identify the channel once and for all. Instead, it is necessary to embed a method which reestimates the channel from time to time in the signal transmission method. In the literature, such methods are treated under the title of system identification and are described in detail, for example, in the book by P. Eykhoff, "System Identification, Parameter and State Estimation", London, Wiley, 1974.

Usually, channels of great length are discussed, that is to say, channels the unit pulse response of which decays slowly in comparison with a period given by the time interval of the data occurring in the transmitter. The channel is then determined only with a coarse resolution. However, it has now been found that it is of significance for an optimum detection of the transmitted data in the receiver, also to estimate short channels with a good resolution. As an example, the simple case of a channel having a fast, short echo shall be mentioned. However, the known methods fail in such cases, the numeric methods become unstable.

SUMMARY OF THE INVENTION

The invention has the object of creating a signal transmission method in accordance with the principle of quadrature/amplitude modulation, in which method digital data occurring at a time interval T are formed into a transmit signal with the aid of pulse shapers having a given unit pulse response r(t) in a transmitter, the transmit signal is transmitted by means of a carrier oscillation via a channel having a channel unit pulse response h(t), when an additive white noise w(t) is superimposed on it, so that a receive signal y(t) is present at a receiver and the receive signal y(t) is preprocessed by channel-matched filters in the receiver, and in which an estimation of the channel is possible with a high resolution.

The way of achieving the object consists in the channel-matched filters being matched to a filter cascade H(t), formed by pulse shapers and channel as a whole.

Thus, the core of the invention lies in the fact that it is not the channel h(t) per se which is estimated but only the filter cascade H(t) formed by the pulse shaper and channel together. If the known numeric methods are applied to this filter cascade H(t), the numeric instabilities no longer occur. In particular, it must be noted that the instabilities do not even occur if the estimated filter cascade H(t) is convoluted with a filter $r^{-1}(t)$, which is inverse to the pulse shaper, in order to obtain the unit pulse response h(t) of the channel itself.

Preferred embodiments of the invention are found in the subclaims.

BRIEF DESCRIPTION OF THE DRAWINGS

In the text which follows, the invention will be explained in greater detail with reference to the illustrative embodiments, taking into consideration the mathematical background and in connection with the drawing, in which.

DESCRIPTION OF THE PREFERRED EMBODIMENTS

The invention will be explained in greater detail with reference to an illustrative embodiment.

Figure 1:
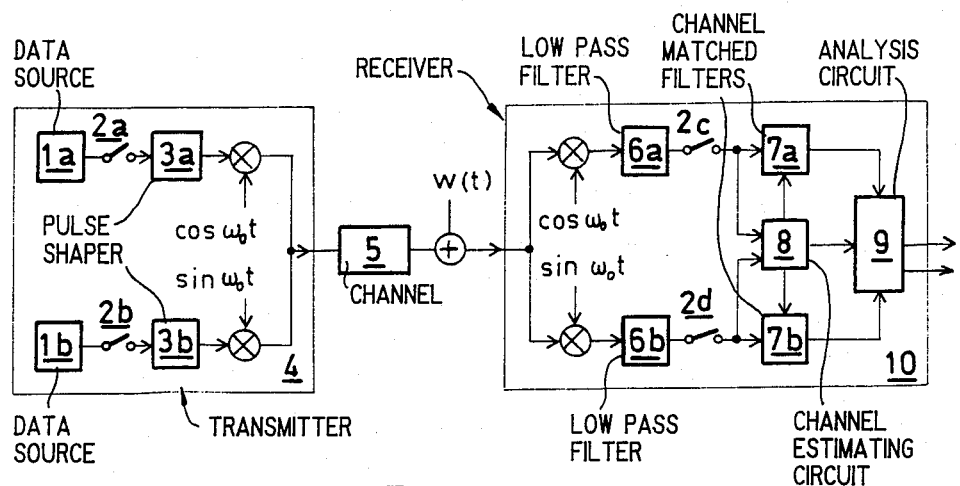
FIG. 1 shows a block diagram of a signal transmission method.

FIG. 1 shows a block diagram of a signal transmission method according to the invention. As already mentioned, this is a quadrature/amplitude modulation method. A data source 1a supplies digital data at a time interval T. sampling device 2a forwards these data to a pulse shaper 3a at periodic times kT (k designating an integral number). The signal emerging from the pulse shaper 3a modulates in a known manner a carrier oscillation cos ($\omega_0 t$), indicated by a multiplication symbol in the Figure.

A carrier oscillation is sin ($\omega_0 t$) is analogously modulated using a data source 1b, a sampling device 2b and a pulse shaper 3b. The two modulated carrier oscillations, which are at quadrature to one another, are combined and form an output signal of a transmitter 4.

A receiver 10 receives the output signal of the transmitter 4 which is transmitted via a channel 5 during which process an additive white noise w(t) is superimposed on it. An input signal produced in this manner is split into two signal branches, also in a known manner. The demodulation of the two branches is indicated in FIG. 1 by a multiplication by cos ($\omega_0 t$), respectively, and by a subsequent low-pass filter 6a and 6b, respectively.

The signals thus obtained are sampled at time intervals $\Delta T$ by sampling devices 2c, 2c. The sampled values of the input signal are preprocessed by channel-matched filters 7a, 7b, after which the original data are determined in an analysis circuit 9.

The channel-matched filters 7a, 7b and the analysis circuit 9 are controlled by a channel estimating circuit 8 on the basis of the values supplied by the sampling devices 2c, 2d.

In the text which follows, the operation of the channel estimating circuit 8 becomes effective, will be described in detail, paying particular attention to the mathematical background.

In a complex notation, the two signals emerging from the pulse shapers 3a, 3b can be combined to form a transmit signal v(t) and the two signals emerging from the low-pass filters 6a, 6b can be combined to form a receive signal y(t). (The transmit signal is frequently called the baseband signal.) The transmit signal v(t) assumes the following form:

$$v(t) = \sum_{k=-\infty}^{\infty} c_k r(t - kT) = c^* r(t) \quad (I)$$

where $$c(t) = \sum_{k=-\infty}^{\infty} c_k \delta(t - kT) \quad (II)$$

r(t) is the unit pulse response of the pulse shaper 3a, 3b. $c_k$ denotes a complex data coefficient which contains the data which are supplied by the data sources 1a, 1b at a particular time kT. c(t) denotes a time-continuous representation of the data coefficients $c^k, \delta(t)$ standing for a dirac pulse. "*" dtands for the convolution product.

The transmit signal is transformed and a white noise w(t) is superimposed on it by the transmission via the channel 5 the unit pulse response of which is h(t). In consequence, a receive signal y(t) of the form $$y(t) = h^*v(t) + w(t) \quad (III)$$

is therefore present in the receiver 10 after demodulation.

It is then intended to estimate the unit pulse response h(t) of the channel 5 in accordance with the principle of the least error squares, that is to say the sum of the squares of the deviations between a transmit signal transmitted without noise h*v(t) and the receive signal y(t) should be minimum:

$$\text{Min}_h \sum_{k=0}^{P} |y(k\Delta T) - h^*v(k\Delta T)|^2 \quad (IV)$$

According to the invention, then, it is not the unit pulse response h(t) of the channel 5 per se but only the filter cascade H(t), formed by pulse shaper and channel, as a whole which is estimated, that is to say $$J = \text{Min}_H \sum_{k=0}^{P} |y(k\Delta T) - H^*c(k\Delta T)|^2 \quad (V)$$

where $$H(t) = h^*r(t) \quad (VI)$$

The solution of this extreme-value problem can be calculated by known numeric methods. Essentially, it is a matter of resolving a linear system of equations of the form $$r_{yc}(l) = \sum_{i=0}^{L_c} R_{cc}(l,i) \hat{H}(i) \quad l = 0 \ldots L_c \quad (VII)$$

with $$r_{yc}(l) = \sum_{k=0}^{P} c_{k-l} \bar{y}_k \quad (VIII)$$

$$R_{cc}(l,i) = \sum_{k=0}^{P} c_{k-l} \bar{c}_{k-i} \quad (IX)$$

("—" mean complex conjugate)

with respect to coefficients H(i).

To be able to assess the stability of a numeric solution of a linear system of equations, a condition number $\mu(R_{cc})$ is usually specified. In simple words, this is a measure of the magnitude of the effect of numeric inaccuracies of a vector $r_{yc}(1)$ on the required coefficients H(i). If the data coefficients $c_k$ have a random distribution, a signal c(t) according to formula (II) is white. $R_{cc}$ then becomes approximately proportional to a unit matrix. In this case, the condition number $\mu(R_{cc})$ is approximately 1, that is to say numeric inaccuracies are not amplified and the system of equations is thus well conditioned. This advantageous characteristic is a main feature of the invention.

The channel estimating circuit 8 contains a computing circuit which estimates the channel by solving the above-mentioned system of equations (formula (VII)). In addition to the receive signal y(t), it must also accept the transmitted data coefficients $c_k$. According to a preferred simple embodiment, the data coefficients $c_k$ to be transmitted are to be determined in advance. In this case, the channel can be estimated, for example, in such a manner that the transmitter 4 initiates the transmission of the sequence of data determined in advance by means of an identification signal so that the receiver 10 is prepared for the appropriate subsequent receive signal. The channel estimating circuit 8 will determine the coefficients H(i) in the manner described above in comparison with the stored predetermined sequence of data. The matrix $R_{cc}$ can be calculated in advance and is permanently stored so that the estimation can proceed quite rapidly. The coefficients H(i) determined are output to the channel-matched filters 7a, 7b, and to the analysis circuit 9.

In another preferred embodiment, the sequence of data needed by the channel estimating circuit 8 is not determined in advance but continuously fed back by the analysis circuit 9, as shown by the dashed line shown in FIG. 1. It is important in such a method that the data determined by the analysis circuit 9 only have a small error probability.

The channel-matched filters 7a, 7b have a unit pulse response M(t) which is obtained in known manner from the unit pulse response of the filter cascade H(t):

$$M(t) = H(-t) \quad (X)$$

They are constructed as transverse filters having equidistant data points. According to formula (X), a coefficient H(i) is associated with each data point.

On the one hand, the length of the transmit signal should be great so that the statistical uncertainty of the channel estimation is small and on the other hand, it should be short in order to keep the computing effort down. This is because the upper index P occurring in formula (V) is determined in accordance with the time interval $\Delta T$ of the data points and in accordance with the length of the receive signal y(t). $L_c$ in formula (VII) is the number of data points of the transverse filter.

The analysis circuit 9 is capable of determining the transmitted data, for example, by means of a Viterbi algorithm or of an equalizer. Details of such methods can be found, for example, in the book by J. G. Proakis initially mentioned.

It should be noted that it is not at all necessary to know the channel unit pulse response h(t) itself in most applications. It is primarily the filter cascade H(t) formed by the pulse shaper and channel which is of interest. Should it be important, nevertheless, to know the channel unit pulse response, one simply forms the convolution product from an estimation of the filter cascade H(t) and a unit pulse response $r^{-1}(t)$ which is inverse to the unit pulse response of the pulse shaper $$h(t) = H * r^{-1}(t) \quad (XI)$$

It is important to note that this convolution product does not destroy the stability of the estimation produced by the method according to the invention.

The advantageous effect of a signal transmission method according to the invention is to be illustrated by means of a realistic example.

The signal transmission method is designed as follows. The data sources 1a, 1b supply binary data at a time interval T=62.5 $\mu$s. The unit pulse response r(t) of the pulse shapers 3a, 3b is a rectangular pulse of length T. The transmit signal extends over 100.62.5 $\mu$s. The channel unit pulse response h(t) extends over 109 $\mu$s and is estimated at 14 data points at a time interval $\Delta T$=7.8125 $\mu$s. Finally, the noise has an intensity of 15 dB referred to a power of the receive signal.

Figure 2:
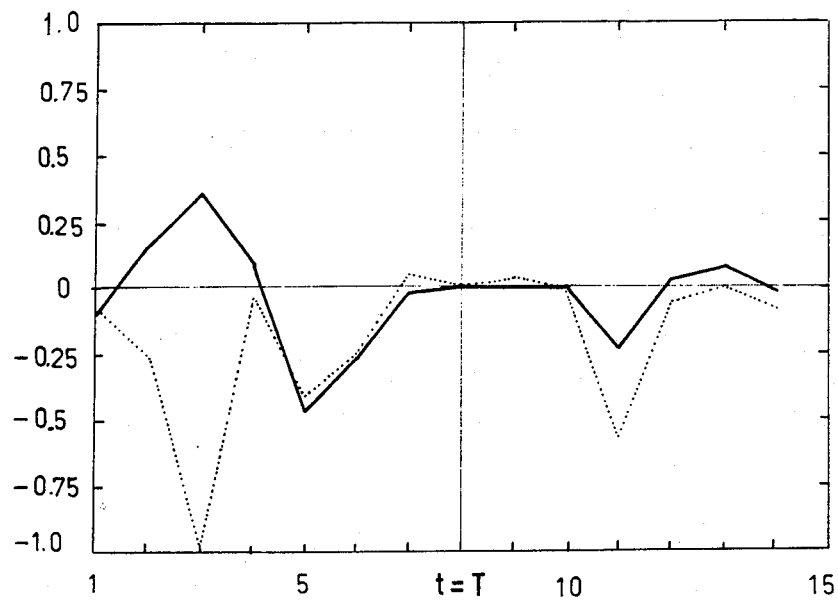
FIG. 2 shows a representation of a unit pulse response of an illustrative channel.

FIG. 2 shows a representation of the actual channel unit pulse response.

Figure 3:
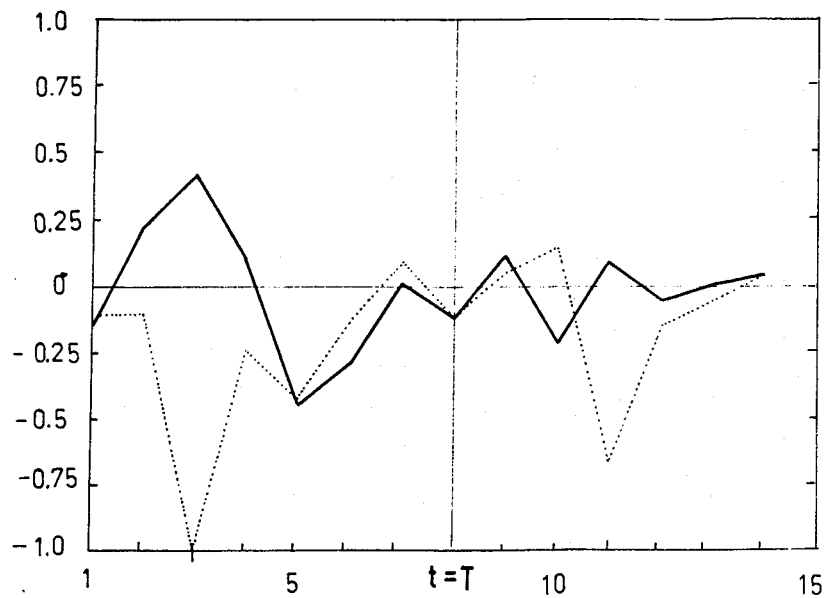
FIG. 3 shows a representation of a unit pulse response of this channel, estimated in accordance with the invention.

FIG. 3 shows a representation of the channel unit pulse response (h(t); $H * r^{-1}(t)$) estimated in accordance with the invention.

Figure 4:
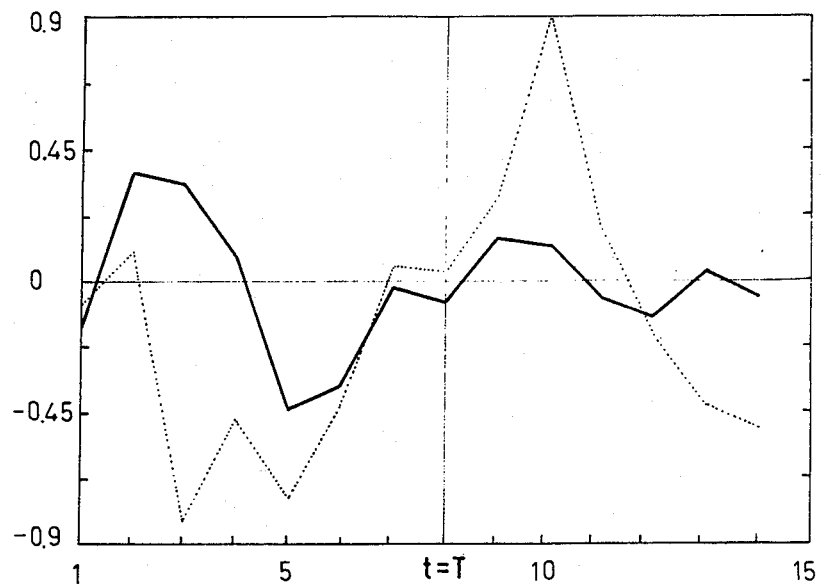
FIG. 4 shows a representation of a unit pulse response of this channel, estimated in accordance with a known method.

FIG. 4 shows as a comparison a representation of a channel unit pulse response which has been estimated in accordance with a known method. It can be clearly seen that this estimation distinctly deviates from the actual channel unit pulse response (FIG. 2).

In the representations of FIGS. 2 to 4, the time is plotted in units of $\Delta T$ along the abscissa and a normalized value of the respective unit pulse response is plotted along the ordinate. The continuous lines show the variation of the real part and the dotted lines show that of the imaginary part of the respective unit pulse response.

The condition number represents an index of the quality of the channel estimation. It is approximately 14 in the method according to the invention whereas it is approximately 190 in the known method. Theoretical considerations supported by tests show that methods according to the invention have condition numbers which approximately correspond to the square root of the condition numbers which occur in known methods.

The sum of the error squares between actual and estimated channel unit pulse responses can be considered as a global quality criterion. In the channel of FIG. 3 estimated in accordance with the invention, the error $$\Delta \hat{H} = \sum_{k=0}^{L_c} |h(k\Delta T) - \hat{h}(k\Delta T)|^2 / \sum_{k=0}^{L_c} |h(k\Delta T)|^2 \quad (XII)$$

is about −7.9 dB and in the channel of FIG. 4, estimated in known manner, it is 0.1 dB. (In many cases, known methods cannot even output any result at all).

Thus, the invention presents a signal transmission method which provides the possibility of good receive quality even for finely structured and short channels.

What is claimed as new and desired to be secured by Letters Patent of the United States is:

1. Signal transmission method according to the principle of quadrature amplitude modulation, comprising the steps of:
   in a transmitter
   (a) sampling digital data in predetermined time intervals T;
   (b) forming a transmit signal by feeding the digital data to a pulse shaper, said pulse shaper having a given unit pulse response r(t);
   (c) amplitude-modulating a carrier oscillation by the transmit signal;
   (d) transmitting said amplitude-modulated carrier oscillation via a channel, said channel having a unit pulse response h(t) and superimposing an additive white noise w(t);
   in a receiver
   (e) demodulating the transmitted carrier oscillation into a receive signal y(t);
   (f) sampling said receive signal in time intervals $\Delta T$ which are small in relation to the time interval T;
   (g) preprocessing said sampled receive signal in a transverse channel-matched filter, said channel-matched filter being matched to a filter cascade H(t) formed by said pulse shaper and said channel as a whole, $H(t) = h * r(t),$ where "*" stands for the convolution product; and
   (h) determining original digital data from the preprocessed sampled receive signal in an analysis circuit.

2. Signal transmission method according to the principle of quadrature amplitude modulation, comprising the steps of:
   in a transmitter
   (a) sampling digital data in predetermined time intervals T, and based thereon generating by that data coefficients $c_k$;
   (b) forming a transmit signal by feeding the data coefficients to a pulse shaper, said pulse shaper having a given unit pulse response r(t);
   (c) amplitude-modulating a carrier oscillation by the transmit signal;
   (d) transmitting said amplitude-modulated carrier oscillation via a channel, said channel having a unit pulse response h(t) and superimposing an additive white noise w(t);
   in a receiver
   (e) demodulating the transmitted carrier oscillation into a receive signal y(t);

(f) sampling said receive signal in time intervals ΔT which are small in relation to the time interval T, and based thereon generating a sampled transmit signal $y_k$;

(g) preprocessing said sampled receive signal $y_k$ in a transverse channel-matched filter, said channel-matched filter being matched to a filter cascade H(t) formed by said pulse shaper and said channel as a whole, $H(t)=h*r(t)$, where * stands for the convolution product, having coefficients H(i), i=0, ..., $L_c$, which are determined in accordance with the principle of least error squares between the transmit signal and the receive signal, fulfilling the equations $$r_{yc}(l) = \sum_{i=0}^{L_c} R_{cc}(l,i) \hat{H}(i), l = 0 \ldots L_c$$

with $r_{yc}(l) = \sum_{k=0}^{P} c_{k-l} \bar{y}_k$, and $$R_{cc}(l,i) = \sum_{k=0}^{P} c_{k-l} \bar{c}_{k-i}$$

where
$c_k$=data coefficient,
$y_k$=sampled transmit signal,
$\bar{y}_k$=complex conjugate of $y_k$, and
$\bar{c}_{k-i}$=complex conjugate of $c_{k-i}$; and (h) determining original data coefficients $c_k$ from the preprocessed sampled receive signal in an analysis circuit.

3. Signal transmission method as claimed in claim 2, using data coefficients for forming the transmit signal and for preprocessing the sampled receive signal, which coefficients correspond to a predetermined sequence of digital data known to the transmitter and the receiver.

4. Signal transmission method as claimed in claim 2, wherein the filter cascade used for preprocessing is periodically estimated.

5. Signal transmission method according to the principle of quadrature amplitude modulation, comprising the steps of:

in a transmitter
(a) sampling digital data in predetermined time intervals T, and based thereon generating data coefficients $c_k$;
(b) forming a transmit signal by feeding the data coefficients to a pulse shaper, said pulse shaper having a given unit pulse response r(t);
(c) amplitude-modulating a carrier oscillation by the transmit signal;

(d) transmitting said amplitude-modulated carrier oscillation via a channel, said channel having a unit pulse response h(t) and superimposing an additive white noise w(t);

in a receiver
(e) demodulating the transmitted carrier oscillation into a receive signal y(t);
(f) sampling said receive signal in time intervals ΔT which are small in relation to the time interval T, generating by that a sampled transmit signal $y_k$;
(g) feeding said sampled receive signal into a channel estimating circuit controlling a transverse channel-matched filter by calculating coefficients H(i), i=0, ..., Lc, which are determined in accordance with the principle of least error squarres between the transmit signal and the receive signal, said coefficients H(i) fulfilling the equations, $$r_{yc}(l) = \sum_{i=0}^{L_c} R_{cc}(l,i) \hat{H}(i), l = 0 \ldots L_c$$

with $r_{yc}(l) = \sum_{k=0}^{P} c_{k-l} \bar{y}_k$, and $$R_{cc}(l,i) = \sum_{k=0}^{P} c_{k-l} \bar{c}_{k-i}$$

where
$c_k$=data coefficient,
$y_k$=sampled transmit signal,
$\bar{y}_k$=complex conjugate of $y_k$, and
$\bar{c}_{k-i}$=complex conjugate of $c_{k-i}$;

(h) preprocessing said sampled receive signal in the transverse channel-matched filter, said channel-matched filter being matched to a filter cascade H(t) formed by said pulse shaper and said channel as a whole,
$H(t)=h*r(t)$, where * stands for the convolution product,
and using said coefficients H(i), i=0, ..., Lc;

(i) determining original data coefficients $c_k$ from the preprocessed sampled receive signal in an analysis circuit; and (k) feeding back the determined data coefficients $c_k$ to the channel estimating circuit.

6. Signal transmission method as claimed in claim 5, comprising the step of determining the channel unit pulse response h(t) by convoluting an estimation of the filter cascade H(t) with a unit pulse response $r^{-1}(t)$ which is inverse to the unit pulse response r(t) of the pulse shaper.

* * * * *